McNALL & WILSON.
Car Wheel.
No. 61,786.  Patented Feb. 5, 1867
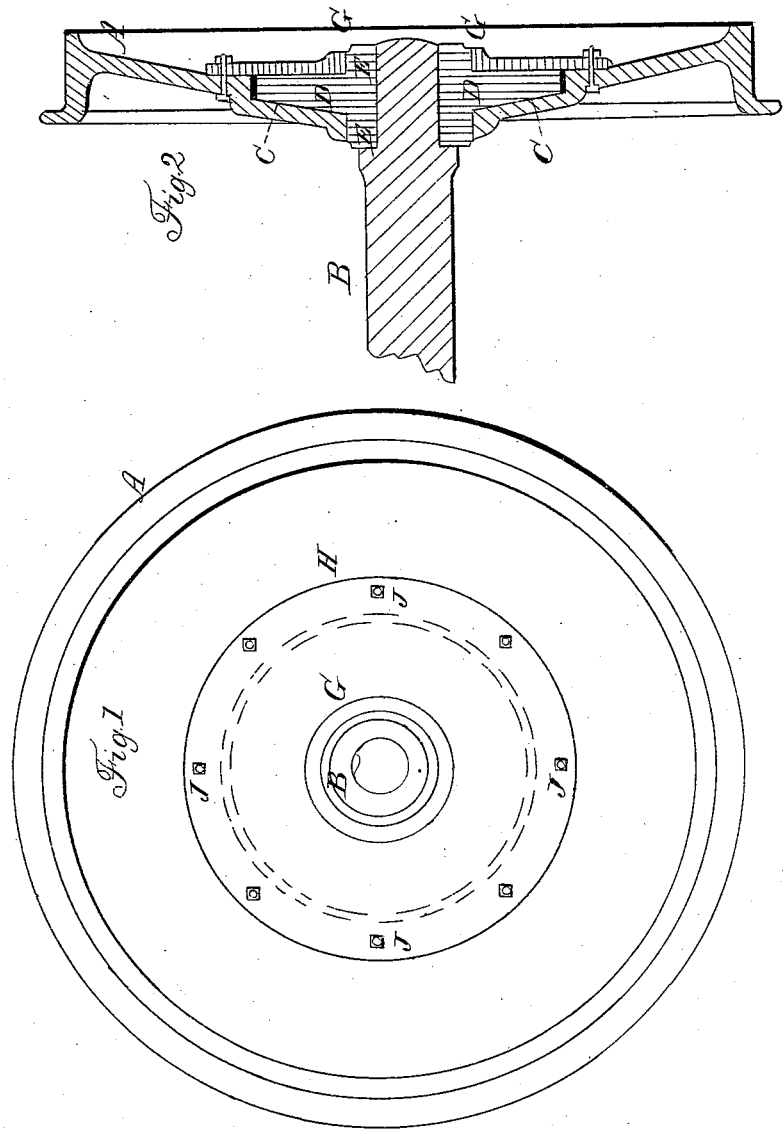

United States Patent Office.

CHARLES WILSON AND J. H. McNALL, OF CLINTON, PENNSYLVANIA.

Letters Patent No. 61,786, dated February 5, 1867.

---

IMPROVED CAR-WHEEL.

---

The Schedule referred to in these Letters Patent and making part of the same.

---

TO ALL WHOM IT MAY CONCERN:

Be it known that we, CHARLES WILSON and JAMES H. McNALL, in the county of Allegheny, and State of Pennsylvania, have invented a new and useful Improvement in Railway Car-Wheels; and we do hereby declare the following to be a full, clear, and exact description thereof, reference being had to the accompanying drawings, and to the letters of reference marked thereon, making part of this specification, in which—

Figure 1 represents a side elevation.

Figure 2 a cross-section.

A represents the cast-iron car-wheel; B the axle; C a circular recess on the outside of the wheel; D is a circular plate or collar, made of any metallic substance permanently fastened to the hub E of the axle B. This plate fits into and revolves in the recess C of the wheel, and prevents the wheel from wobbling; the hub E projecting through the aperture G of the wheel, and the hub E on each side of the collar D, act as bearings for the wheel to revolve on, these bearings being of any dimensions. H is an outside circular plate, (of any metallic substance,) fastened permanently by screw-bolts J to the wheel A, and secures the wheel to the axle.

The object of this wheel is to act independently on a curve, and when the cars are on a straight line of the railway, the wheel then revolves with the axle, and in case of any obstruction from a small stone or stick of wood lying on the rail, the wheel will pass easily over without causing a twist in the axle so as to throw the cars off the track or break the axle, as frequently happens. The wheel can also be used reversed, by changing the inside of the wheel to face the outside, and in case of the accidental breaking of the flange or rim of a wheel, the wheel can be taken off and replaced without taking off the axle, as necessary with the present wheels as they are fastened. We merely unscrew the bolts J, and replace the wheel. The collar D, and circular plate H, if we deem it necessary, may be enlarged so as to extend to the rim of the wheel. In making our collar D and hub E, we propose to chill them if we deem it necessary.

What we claim as our invention, and desire to secure by Letters Patent, is—

The construction of the wheel with its circular recess C, collar D, operating in the recess, and circular plate H, arranged and combined as herein described, and for the purposes set forth.

In testimony whereof we, the said CHARLES WILSON and JAMES H. McNALL, have hereunto set our hands in presence of—

CHARLES WILSON,
JAS. H. McNALL.

Witnesses:
L. P. STONE,
ALEX. B. RIGGS.